(12) United States Patent
McKernan

(10) Patent No.: US 11,650,596 B2
(45) Date of Patent: May 16, 2023

(54) LOAD ALIGNMENT AID

(71) Applicant: Cascade Corporation, Fairview, OR (US)

(72) Inventor: Pat McKernan, Portland, OR (US)

(73) Assignee: Cascade Corporation, Fairview, OR (US)

( * ) Notice: Subject to any disclaimer, the term of this patent is extended or adjusted under 35 U.S.C. 154(b) by 547 days.

(21) Appl. No.: 16/428,281

(22) Filed: May 31, 2019

(65) Prior Publication Data

US 2020/0379476 A1 Dec. 3, 2020

(51) Int. Cl.
*G05D 1/02* (2020.01)
*B66F 9/12* (2006.01)

(52) U.S. Cl.
CPC .......... *G05D 1/0246* (2013.01); *B66F 9/122* (2013.01)

(58) Field of Classification Search
CPC .............................. G05D 1/0246; B66F 9/122
See application file for complete search history.

(56) References Cited

U.S. PATENT DOCUMENTS

| | | | |
|---|---|---|---|
| 4,861,223 A | 8/1989 | Olson | |
| 4,927,320 A | 5/1990 | Olson | |
| 8,157,500 B1 | 4/2012 | Husmann | |
| 8,869,413 B2 | 10/2014 | Grierson, Sr. | |
| 9,296,326 B1 | 3/2016 | Young | |
| 2004/0073359 A1* | 4/2004 | Ichijo | B66F 9/0755 701/50 |
| 2009/0114485 A1 | 5/2009 | Eggert | |
| 2009/0278927 A1 | 11/2009 | Ishiyama et al. | |
| 2012/0146789 A1 | 6/2012 | De Luca et al. | |
| 2012/0147139 A1* | 6/2012 | Li | G03B 35/08 348/E13.064 |
| 2012/0209478 A1 | 8/2012 | Dammeyer et al. | |
| 2014/0326541 A1 | 11/2014 | Dammeyer et al. | |
| 2014/0326542 A1 | 11/2014 | Dammeyer et al. | |
| 2014/0330488 A1 | 11/2014 | Dammeyer et al. | |
| 2015/0344278 A1 | 12/2015 | Dammeyer et al. | |
| 2016/0090284 A1* | 3/2016 | Svensson | B66F 9/0755 701/50 |
| 2016/0138248 A1 | 5/2016 | Conway et al. | |

(Continued)

FOREIGN PATENT DOCUMENTS

| | | | |
|---|---|---|---|
| CN | 105806563 A | * | 7/2016 |
| CN | 206219146 U | * | 6/2017 |

(Continued)

OTHER PUBLICATIONS

Italian Patent Publication No. 102017000012164 dated Feb. 3, 2017, 38 pages.

*Primary Examiner* — Hunter B Lonsberry
*Assistant Examiner* — Harrison Heflin
(74) *Attorney, Agent, or Firm* — Chernoff, Vilhauer, McClung & Stenzel, LLP

(57) ABSTRACT

A load alignment aid with range finding sensors positioned diagonally on a mounting platform to calculate range, vertical alignment, and horizontal alignment. Each sensor measures a distance (d) from the mounting platform to the load. Where d(1) does not equal d(2) and d(1) does not equal d(3), a misalignment due to tilt or chassis misalignment is detected. The aid further includes a display which may show a graphic representation of the approach to a load and an alert for misalignment notification.

5 Claims, 3 Drawing Sheets

(56) References Cited

U.S. PATENT DOCUMENTS

| | | | |
|---|---|---|---|
| 2016/0217558 A1* | 7/2016 | Lee | G06T 7/80 |
| 2017/0277961 A1* | 9/2017 | Kuehnle | G06T 3/4038 |
| 2018/0086615 A1 | 3/2018 | Swift | |
| 2018/0222734 A1 | 8/2018 | Bovo et al. | |
| 2020/0068185 A1* | 2/2020 | Tzabari | H04N 13/122 |
| 2020/0202487 A1* | 6/2020 | Viswanathan | G06T 7/97 |
| 2020/0247651 A1* | 8/2020 | Wang | G03B 29/00 |
| 2020/0377351 A1* | 12/2020 | Uchimura | B66F 9/24 |

FOREIGN PATENT DOCUMENTS

| | | | | |
|---|---|---|---|---|
| EP | 2407414 A1 | 1/2012 | | |
| IT | 201700012164 A1 | 2/2017 | | |
| JP | 2006096457 A * | 4/2006 | | |
| JP | 4666154 B2 * | 4/2011 | | |
| WO | WO-9635631 A1 * | 11/1996 | | B66F 9/0755 |
| WO | WO-2019198061 A1 * | 10/2019 | | A61B 17/3403 |
| WO | WO-2020085068 A1 * | 4/2020 | | B66F 9/24 |
| WO | WO-2020170747 A1 * | 8/2020 | | B66F 9/24 |
| WO | WO-2020189154 A1 * | 9/2020 | | G06T 7/70 |

* cited by examiner

LOAD ALIGNMENT AID

BACKGROUND OF THE INVENTION

Lift truck and material handling procedures involve load damage, productivity, and efficiency concerns. Foremost among these is the concern for equipment operators to accurately determine the alignment of equipment to the material or load being handled. Even slight misalignment results in damage to the load, strain on or destabilization of equipment and could result in injury to workers. The load alignment aid described herein, addresses this concern by employing pre-arranged parallelism sensors which provide feedback to the operator of each of axial range, lateral and vertical alignment. Each a difficult thing for an operator to judge from the operator's position. The feedback to the operator is on a display which employs a graphic representation of the range, vertical alignment and lateral alignment in a grid.

Known prior art systems employ either distance sensors for range or a tilt sensor for vertical alignment with the ground without consideration of the load, however they fail to aide in horizontal alignment and fail to combine each of those inputs into a single interface.

Presented herein is a unique way of employing the outputs of the three sensors to determine three values, by determining horizontal range and vertical range, and from these determining optimal vehicle positioning and displaying this information on a display for an operator or a controller.

BRIEF SUMMARY OF THE INVENTION

This disclosure supports a system for providing feedback to a lift truck operator or controller that the forks or loading engaging surfaces of a lift truck, loader, pallet handler, or other material handling equipment are in the correct alignment to a target load. This feedback is provided directly to the operator or controller of such equipment in real-time on an integrated display, minimizing the need to continually adjust to multiple viewing points, greatly improving accuracy, speed and efficiency at the pickup location. The feedback includes a grid representation which allows the operator or controller to adjust the load engaging element to a correct range, horizontal aligned and level condition while in motion at each successive pick. Permitting easy alignment with the loading slots, bulk loads (rolls or cartons) and pallets, reduces load damage and improves speed, efficiency, and safety.

A load alignment aid includes range finding sensors positioned diagonally on a mounting platform to calculate range, vertical alignment, and horizontal alignment. Each sensor measures a distance (d) from the mounting platform to the load. Where d(1) does not equal d(2) and d(1) does not equal d(3), a misalignment due to tilt or chassis misalignment is detected. The aid further includes a display which may show a graphic representation of the approach to a load and an alert for misalignment notification.

By improving ease and improving operator awareness of the degree of correct alignment and range, the operator will experience less damage to loads, the ability to move loads more efficiently, and will result in a better, less stressful work environment.

The foregoing and other objectives, features, and advantages of the invention will be more readily understood upon consideration of the following detailed description of the invention taken in conjunction with the accompanying drawings.

DETAILED DESCRIPTION OF THE INVENTION

In one embodiment, three range finding sensors are positioned diagonally on a mounting platform to calculate three values including range, vertical and horizontal alignment. Each sensor measures a distance (d) from the mounting platform to the load. Where d(1) does not equal d(2) and d(1) does not equal d(3), a misalignment is detected. Misalignment information may include at least one of d(1), d(2), d(3), predetermined distances, and differences between d(1), d(2), d(3), and predetermined distances. Stated otherwise, misalignment due to tilt in either a forward or backward direction and further due to truck chassis alignment to the load is detected by a small difference in distance. The average distance between d(1) and d(3) is equal to the range or distance to the load.

Figure 1:
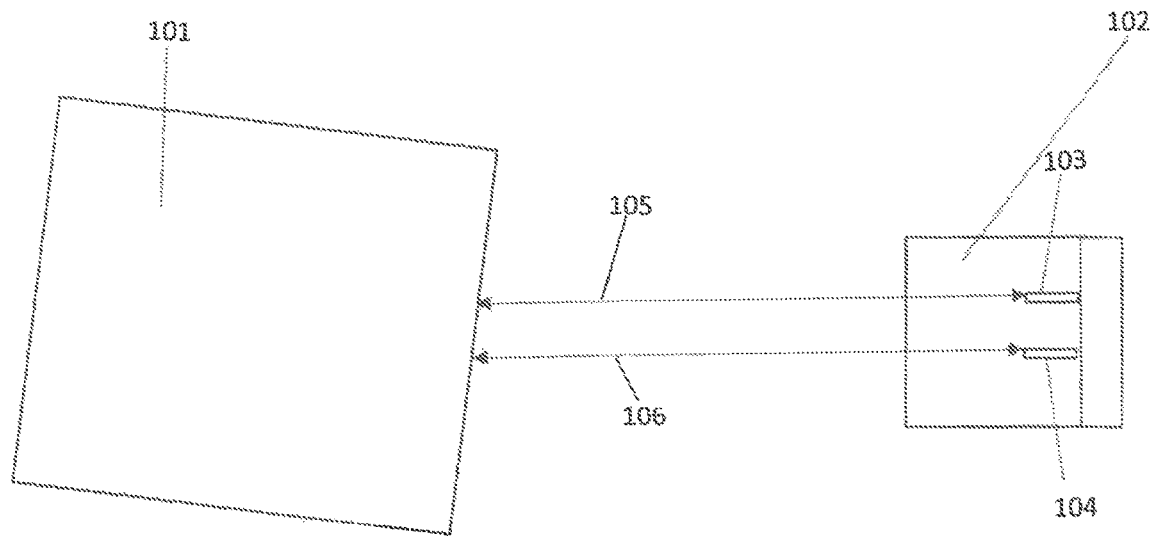
FIG. 1 is a top view showing an embodiment of lines of sight of lateral alignment and range beams.

As seen in FIG. 1, d(1) (represented by 105) is not equal to d(3) (represented by 106) measured by sensors 103 and 104 respectively from the mounting platform 102 to a side load 101. This indicates that the load is not laterally aligned in a known orientation to the lift truck.

Figure 2:
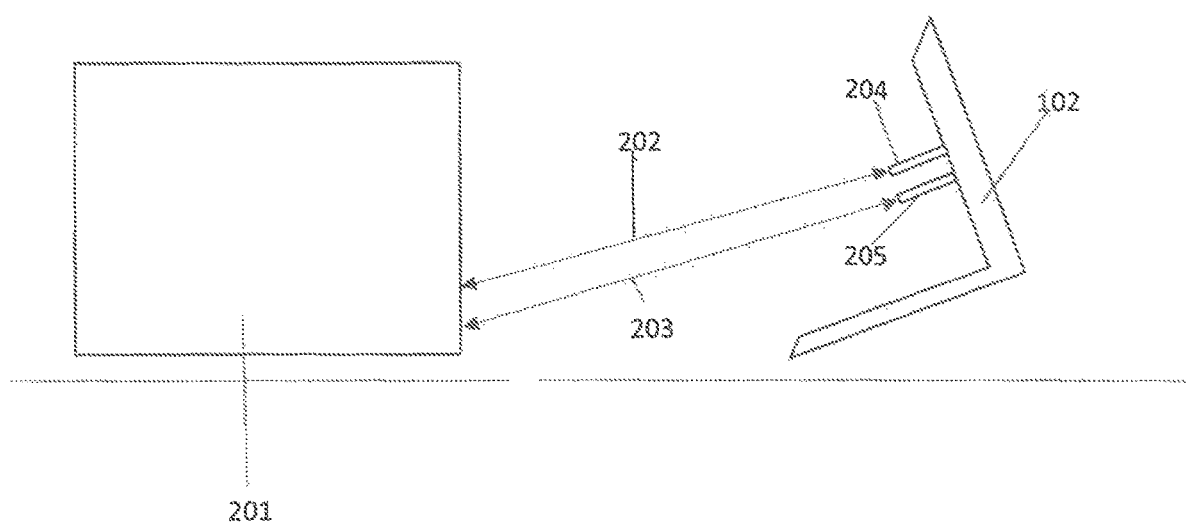
FIG. 2 is a side view showing an embodiment lines of sight of vertical alignment beams.

As seen in FIG. 2, d(1) (represented by 202) is not equal to d(2) (represented by 203) measured by sensors 204 and 205 respectively from the mounting platform 102 to the top of a load 201, this indicates that the load is tilted in a known orientation as it relates to the lift truck.

Figure 3:
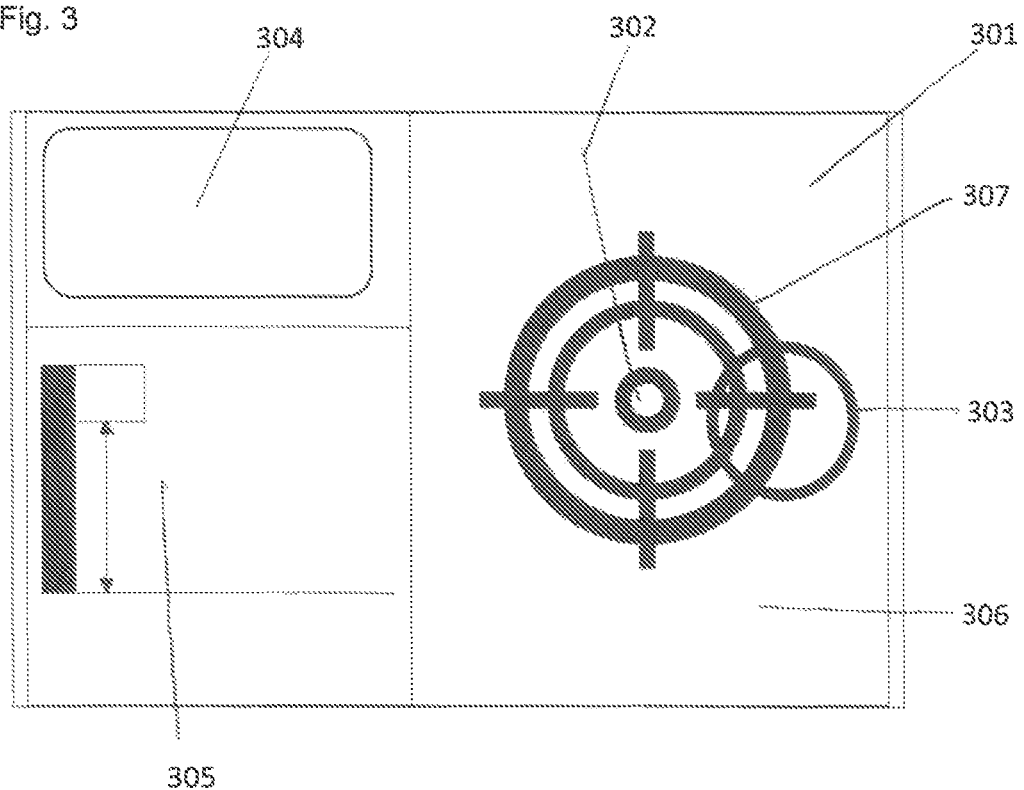
FIG. 3 is a planar view of an embodiment of the display.

As seen in FIG. 3, the range to and orientation of the load is seen by the operator as the status circle 303. Misalignment is represented on a display 301 where a graph 306 shows both the target 302, the concentric circles 307 illustrate predetermined distances to the target, and of the present alignment. A user adjusts the approach toward the load to align with the target, where X-axis is the lateral alignment register and the Y-axis is the vertical alignment indicator. An optional video display 304 may show a real time view of the approach to the load. An optional vertical position display 305 may show the vertical lift of the load.

Figure 4:
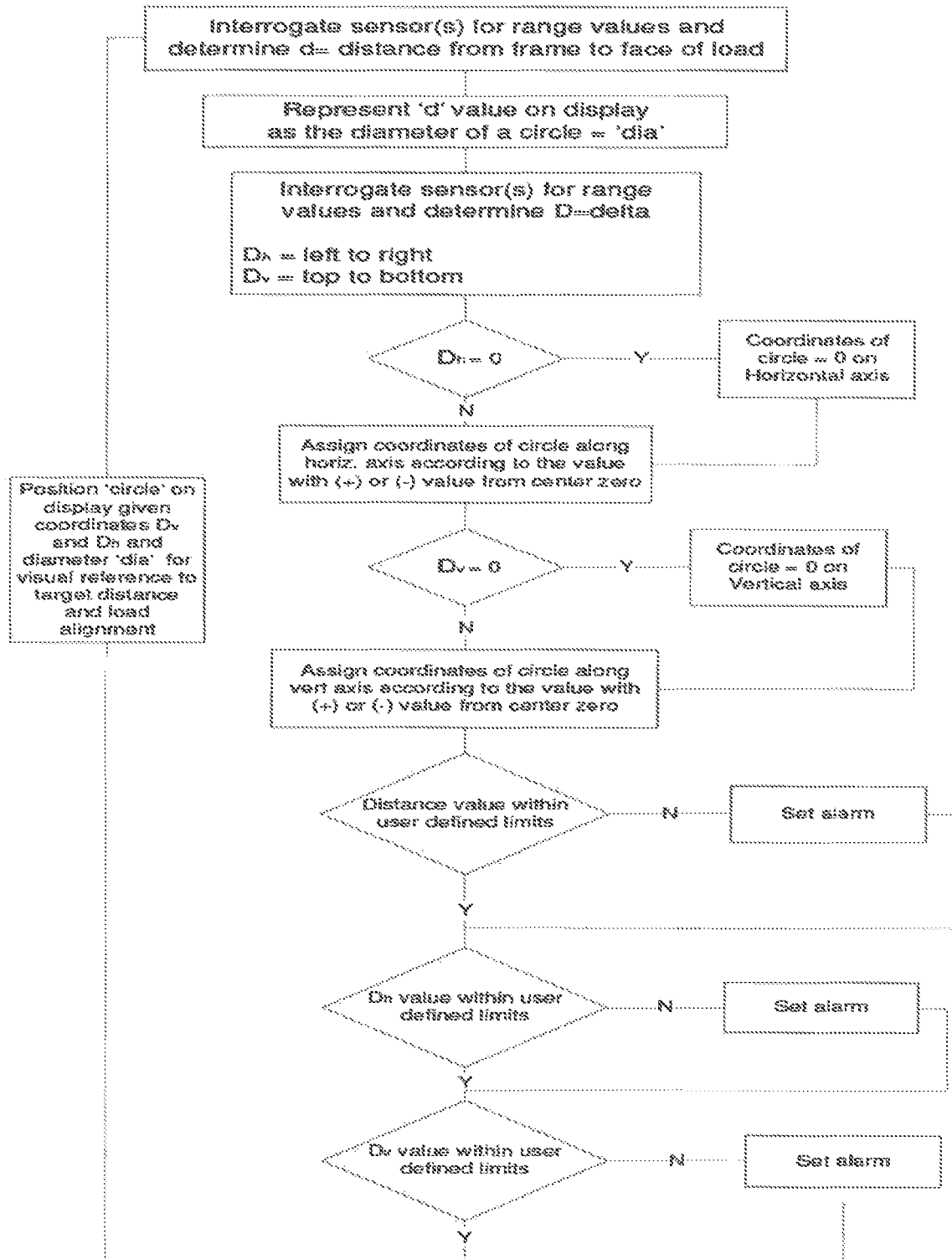
FIG. 4 is a flow chart of the load alignment function.

As seen in FIG. 4, the load alignment aid may alarm if the load fails to align within set distance, set tilt, and set lateral alignment. The concentric rings 307 may be set to correspond to set distances from the target 302, while the present alignment shown on the X/Y graph 306 of the load represents Dh (left to right) and Dv (top to bottom) range values from the mounting platform to the load.

In one embodiment, a 3D laser sensors is mounted on a mounting platform. The laser sensor may have fields of interest that act like individual sensors, for an all in one sensor, or may optionally use multiple sensors. For field of interest sensors, IFM lidar sensors are suitable and provide a more cost effective system. In this example, the each of the three sensors or single 3D sensor detects a distance (d) between the mounting platform and the target load. These distances are plotted on the graph 306, which may be an X/Y graph. The display indicates the alignment of the load compared to the target center. The labels on the graph 306 provide easy reference to the operator while enhancing, by way of the display, the understanding of what adjustments should be made to the approach to the load.

Apart from visual representation of alignment, a disparity in d(1), d(2) and d(3) measurements or a threshold of an assigned value for the disparity may cause a variable audible signal or alarm to be played to provide further indication to the operator of the discrepancy between the current position and the target center. In another embodiment, if the truck is an automatically guided vehicle (AGV), this disparity may be communicated to an AGV controller of the truck to permit the controller to make adjustments to the approach. These adjustments may be full automatic or partially automatic and partially manual.

As seen in FIG. 3, other information can be displayed in conjunction with the graph 306 to aid the operator. These additional displays may include camera output, which may aid in load identification or in preventing load damage. The display may include an indicator of the height of the bottom of the clamp. Optionally, the display may include a height indication to identify load height separation points or rack heights preset or as determined by a vision system or line detection system. The display may include buttons for activation of various features such as a laser line indicator, video recording, load illumination, scanner activation or other features that are switched on or off. The display may include a data log or other features.

In another example, a dynamic alignment display system for a lift truck is provided, the system comprising a display configured to provide a visual image; and a controller configured to receive a first signal from the sensor(s) and generating an image on the display representing a dynamic center target, the controller overlaying the dynamic center target over the image detected by the camera; wherein the image varies based on a distance between the mounting platform and the load. This facilitates display of a representation of the lift truck, the target end point, and guide lines or arrows for the driver to follow to reach the end point.

The display of a concentric target rings may accompany the display of the center target, so the operator may gage how the operator's adjustments bring the load more closely to a center target alignment.

The X/Y graphic may utilize an image as generated using a homography matrix calibrated for any parallax or similar distortion.

In one embodiment, the disclosure provides for a dynamic range display system for a lift truck, the system comprising a sensing unit, positioned on a vehicle in an orientation where the sensing unit is capable of determining the differences in distance to a load in both the horizontal and vertical axis, where the sensing unit is a set of at least two sensors or a single range sensor capable of generating a 3D representation of an object of interest in the field ahead of the vehicle; a controller using the sensing unit input to determine a) the distance to the object of interest and b) the horizontal and c) vertical spatial alignment of the vehicle axis and an object of interest; and a display configured to use the controller output wherein the image on the display, representing the object of interest, varies based on a distance and alignment between the sensing unit and the object of interest and generates a dynamic center target that enhances the operators ability to interoperate the distance and alignment values.

The embodiment may include an alarm to alerting when the distance or alignment between the truck and the object of interest is greater than a predetermined variance. Optionally, the embodiment may also include a display of a concentric target ring which is concentric with the center target representing the relative distance between the vehicle, the object of interest and other predetermined distances. These options help the use to focus on movement towards the object of interest.

The display 301 may show 3D image (not shown), which may aid in addressing rotational misalignment. In one embodiment, this 3D image may be generated using a homography matrix or epipolar geometry, optionally generated by using a calibration procedure. In the epipolar configuration, for example:

F is a rank 2 homogeneous matrix with 7 degrees of freedom.
Point correspondence: If x and x' are corresponding image points, then $x'^T F x = 0$.
Epipolar lines:
$l' = Fx$ is the epipolar line corresponding to x.
$l = F^T > x'$ is the epipolar line corresponding to x'.
Epipoles:
$Fe = 0$.
$F^T > e' = 0$.
Computation from general sensors with matrices P,P':
$F = [e'] \times P'P+$, where $P^+$ is the pseudo-inverse of P, and $e' = P'C$, with $PC = 0$.

The display 301 may also permit overlaying an image of the dynamic center target over an image detected by a camera.

Another embodiment is a method of assisting an operator of a truck in determining an alignment between the truck and a load, the method comprising: displaying an image representative of a present position of the load; detecting a present position of the load; overlaying a present center target on the displayed image; and adjusting the displayed image based on the dynamic position of the truck relative to the load. Optionally the method may include transmitting the dynamic position of the truck relative to the load to an automatic guided vehicle controller.

A further embodiment of this method includes providing a display to correlate distance measurements from a distance sensor unit to a load, said display providing a graphic overlay super-imposed on a main image to provides visual steering assistance, said graphic overlay including an alignment lines having a vertical alignment and horizontal alignment which are determined by a distance sensing unit; providing vehicle dynamic modeling for identifying the motion of the lift truck as the lift truck moves; predicting a path of the lift truck as it is being steered relative to a target; and providing a human-machine interface (HMI) which allows a user to set preferences for display and for distance sensor unit.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:
1. A dynamic range display system for a lift truck, the system comprising:
   a. A sensing unit, positioned on a vehicle in an orientation where the sensing unit is capable of determining the differences in distance to a load in both the horizontal and vertical axis, where the sensing unit is a single range sensor capable of generating a 3D representation of an object of interest in the field ahead of the vehicle;

b. A controller using the sensing unit input to determine a) the distance to the object of interest and b) the horizontal and c) vertical spatial alignment of the vehicle axis and an object of interest; and c. A displayer configured to use the controller output wherein the image on the display, representing the object of interest, varies based on a distance and alignment between the sensing unit and the object of interest and generates a dynamic center target that enhances the operator's ability to interoperate the distance and alignment values;

wherein the image is generated using an image matrix which is a homography matrix or an epipolar matrix; and wherein the image matrix is generated using a calibration procedure, and where, in the calibration procedure, F is a rank 2 homogeneous matrix with 7 degrees of freedom;

further including a point correspondence such that if x and x' are corresponding image points, then $x'^T Fx=0$; further including epipolar lines where $I'=Fx$ is an epipolar line corresponding to x and $I=F^T>x'$ is an epipolar line corresponding to x'; further including an epipoles where Fe=0 and $F^T>e'=0$; and wherein computation from general sensors with matrices P,P': $f=[e'] \times P'P$, where P* is the pseudo-inverse of P, and e'=P'C, with PC=0.

2. The system of claim 1, further comprising an alarm, the alarm alerting when the distance or alignment between the truck and the object of interest is greater than a predetermined variance.

3. The system of claim 1, further characterized by the display of a concentric target ring which is concentric with the center target representing the relative distance between the vehicle, the object of interest and other predetermined distances.

4. The system of claim 1, further characterized by the controller overlaying the dynamic center target over an image detected by a camera.

5. The system of claim 1, further comprising a transmitter for transmitting misalignment information to a truck controller.

* * * * *